US010486977B2

(12) United States Patent
Kim et al.

(10) Patent No.: US 10,486,977 B2
(45) Date of Patent: Nov. 26, 2019

(54) LOW ABSORPTION SPINEL FORMED BY ACIDIC AND BASIC TREATMENTS

(71) Applicant: The Government of the United States of America, as represented by the Secretary of the Navy, Arlington, VA (US)

(72) Inventors: Woohong Kim, Lorton, VA (US); Guillermo R. Villalobos, Lorton, VA (US); Colin C. Baker, Alexandria, VA (US); Shyam S. Bayya, Ashburn, VA (US); Michael Hunt, Alexandria, VA (US); Bryan Sadowski, Falls Church, VA (US); Ishwar D. Aggarwal, Waxhaw, NC (US); Jasbinder S. Sanghera, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 226 days.

(21) Appl. No.: 15/220,072

(22) Filed: Jul. 26, 2016

(65) Prior Publication Data
US 2017/0029285 A1    Feb. 2, 2017

Related U.S. Application Data

(60) Provisional application No. 62/198,513, filed on Jul. 29, 2015.

(51) Int. Cl.
*C01F 7/16*        (2006.01)
*C04B 35/443*   (2006.01)
(Continued)

(52) U.S. Cl.
CPC ............. *C01F 7/162* (2013.01); *C01F 7/47* (2013.01); *C04B 35/443* (2013.01);
(Continued)

(58) Field of Classification Search
CPC . C01F 7/47; C01F 7/46; C04B 35/443; C04B 2235/763; C04B 2235/3222
See application file for complete search history.

(56) References Cited

U.S. PATENT DOCUMENTS 1,798,261 A * 3/1931 Horsfield ............... C01F 7/027
423/132
2,052,486 A * 8/1936 Olsen ......................... C01F 7/04
23/296

(Continued)

FOREIGN PATENT DOCUMENTS

CN          102583467 A  *  7/2012
GB              1375996 A  *  12/1974  ............... C01F 7/46

OTHER PUBLICATIONS

CN 102583467 A (Fu et al.) Jul. 18, 2012 (English language machine translation). [online] [retrieved Mar. 26, 2019]. Retrieved from: Espacenet. (Year: 2012).*

(Continued)

*Primary Examiner* — Erin Snelting
(74) *Attorney, Agent, or Firm* — US Naval Research Laboratory; Rebecca L. Forman

(57) ABSTRACT

A method of purifying a spinel powder includes contacting a spinel powder with an acid solution to form an acid-washed spinel composition and contacting the acid-washed spinel composition with a basic solution to form a purified composition. The purified powder is suited to formation of low-absorption shaped bodies, such as windows for high intensity laser devices.

22 Claims, 6 Drawing Sheets

(51) Int. Cl.
C01F 7/47 (2006.01)
C04B 35/64 (2006.01)
C04B 35/645 (2006.01)

(52) U.S. Cl.
CPC ...... *C04B 35/6455* (2013.01); *C01P 2002/32* (2013.01); *C01P 2006/80* (2013.01); *C04B 2235/5436* (2013.01); *C04B 2235/5445* (2013.01); *C04B 2235/72* (2013.01); *C04B 2235/763* (2013.01); *C04B 2235/77* (2013.01); *C04B 2235/96* (2013.01); *C04B 2235/9653* (2013.01)

(56) References Cited

U.S. PATENT DOCUMENTS

| | | | | |
|---|---|---|---|---|
| 4,820,498 | A | * | 4/1989 | Newkirk .............. C01F 7/422 264/332 |
| 9,023,301 | B2 | * | 5/2015 | Boudreault .......... C01F 7/066 423/82 |
| 2006/0217260 | A1 | * | 9/2006 | Villalobos .......... C04B 35/443 501/120 |
| 2009/0220790 | A1 | * | 9/2009 | Kim .................. B82Y 30/00 428/402 |

OTHER PUBLICATIONS

Klein, "Figures of merit for high-energy laser-window materials: thermal lensing and thermal stresses," SPIE 6403 640308-1-640308-16 (2007).

Kim et al., "Synthesis of High Purity Yb3+ Doped Lu2O3 Powder for High Power Solid-State Lasers," J. Am. Cer. Soc., 94, 3001-3005 (2011).

Li et al., "Synthesis of Mg-Al spinel powder via precipitation using ammonium bicarbonate as the precipitant," Journal of the European Ceramic Society, 21, 139-148 (2001).

Bailey et al., "Sintered Spinel Ceramics," Ceramic Bulletin, 47 (11), 1025-1029 (1968).

Bratton, "Coprecipitates Yielding MgAl2O4 Spinel Powders," Ceramic Bulletin, 48(8), 759-762 (1969).

Katanic-Popovic et al., "Spinel Formation from Coprecipitated Gel," Ceramics International, 17, 49-52 (1991).

Hokazono et al., "The Sintering Behaviour of Spinel Powders Produced by a Homogeneous Precipitation Technique," Br. Ceram. Trans. J., 91, 77-79 (1992).

Villalobos et al., "Analysis of Scattering Sites in Transparent Magnesium Aluminate Spinel," Cera. Eng. Sci. Proc. 26, 23 (2005).

* cited by examiner

US 10,486,977 B2

LOW ABSORPTION SPINEL FORMED BY ACIDIC AND BASIC TREATMENTS

This application claims the benefit of U.S. Provisional Application No. 62/198,513, filed on Jul. 29, 2015, by Woohong Kim et al., entitled LOW ABSORPTION SPINEL, the disclosure of which is incorporated herein by reference, in its entirety.

BACKGROUND

Aspects of the exemplary embodiment relate to the purification of spinel-containing powders and find particular application in connection with the formation of low absorption spinel ceramics.

High-energy laser (HEL) exit aperture (windows) are currently being evaluated for various land, sea, and air based platforms. Some of these systems operate in or have to withstand harsh environment of sand storm, hurricane, and rain. Ideal exit aperture windows for HEL systems should possess low absorption and scattering losses and be environmentally rugged and strong in order to protect the laser gain medium without compromising the light propagating through the window.

Rugged window materials such as sapphire, aluminum oxynitride (ALON), and spinel ($MgAl_2O_4$) have been evaluated as a potential replacement for fused silica windows, which are at risk of damage in some environments. These materials are rugged but tend to have an absorption coefficient at the laser wavelength of interest. Transparent spinel ceramic windows fabricated using spinel powders often show high absorption and scattering losses mainly due to the presence of chemical impurities and trapped pores, respectively. A relatively low quality window may be suitable for some applications, such as chemical and biological sensors and transparent armors. For applications where low optical loss is desired, such as exit aperture windows for high energy laser systems, however, absorption causes a cascade effect that negatively impacts the emitted laser power. When a high-energy beam is transmitted through a window material, a part of the laser energy is absorbed (usually by impurity elements that form absorption centers) and cause the window to heat. Heating, in turn, causes changes in the refractive index (n) of the window as a function of the material's thermo-optic coefficient (dn/d T). These changes result in beam distortion and loss of output power as measured by the optical path distortion (OPD) and can have a severe impact on system performance. In the worst case, a window may fail catastrophically.

Spinel is a good candidate for these applications due to its high mechanical strength, high thermal conductivity, and excellent optical transmission between 0.2-5 µm. However, spinel ceramics fabricated with powders generated by conventional methods often exhibit inhomogeneity and suffer from absorption and scattering caused by various types of intrinsic and extrinsic impurities present in the powders. See G. Villalobos et al., "Analysis of scattering sites in transparent magnesium aluminate spinel," Cera. Eng. Sci. Proc., 26, 23 (2005). For example, the absorption of spinel fabricated with many existing powders may be above 21,000 ppm/cm in the 1-2 µm range. Therefore, high purity starting powders are desirable for preventing a potential failure of the HEL window caused by absorption.

Recently, a low absorption loss has been achieved using spinel window fabricated using powders synthesized by a purification and synthesis method described in Sanghera, et al., "Transparent Ceramics for High Energy Laser," Optical Materials, 33, 511-518 (2011). A more cost-effective and scalable process, however, is desirable, particularly for making large size windows.

A method for purifying spinel powders is described herein which can significantly lower the absorption loss of transparent spinel ceramics while being scalable and cost-effective.

BRIEF DESCRIPTION

In accordance with one aspect of the exemplary embodiment, a method of purifying a spinel powder includes contacting a spinel powder with an acid solution to form an acid-washed spinel composition and contacting the acid-washed spinel composition with a basic solution to form a purified composition.

In accordance with another aspect of the exemplary embodiment, a method of forming a shaped body includes contacting a powder which includes a spinel with an acid solution to form an acid-washed spinel composition, contacting the acid-washed spinel composition with a basic solution to form a purified composition having a pH of from 7-8.5, and sintering the purified composition to form the shaped body.

DETAILED DESCRIPTION

Aspects of the exemplary embodiment relate to methods for forming purified, low absorption spinel powders and to shaped bodies formed therefrom, such as windows for laser beam transmission. The purified spinel powder exhibits reduced single-element and single-element oxide impurities and has improved absorption properties compared to the starting spinel powder. For example, the absorption loss of a purified spinel powder formed into a spinel ceramic can be improved.

In particular embodiments, a method of purifying a spinel containing powder includes a) contacting the spinel powder with an acid solution to form an acid-washed spinel composition; and b) neutralizing the acid-washed spinel composition with a basic solution to form a neutralized composition.

It has now been found that even low levels of some impurities, such as one part per million (ppm) of transition metals, such as Fe, Cu, and Cr, can result in hundreds to thousands of ppm/cm absorption loss in a transparent ceramic window. The exemplary method improves the removal of transition metals and thus can achieve significant decreases in absorption loss.

Figure 1:
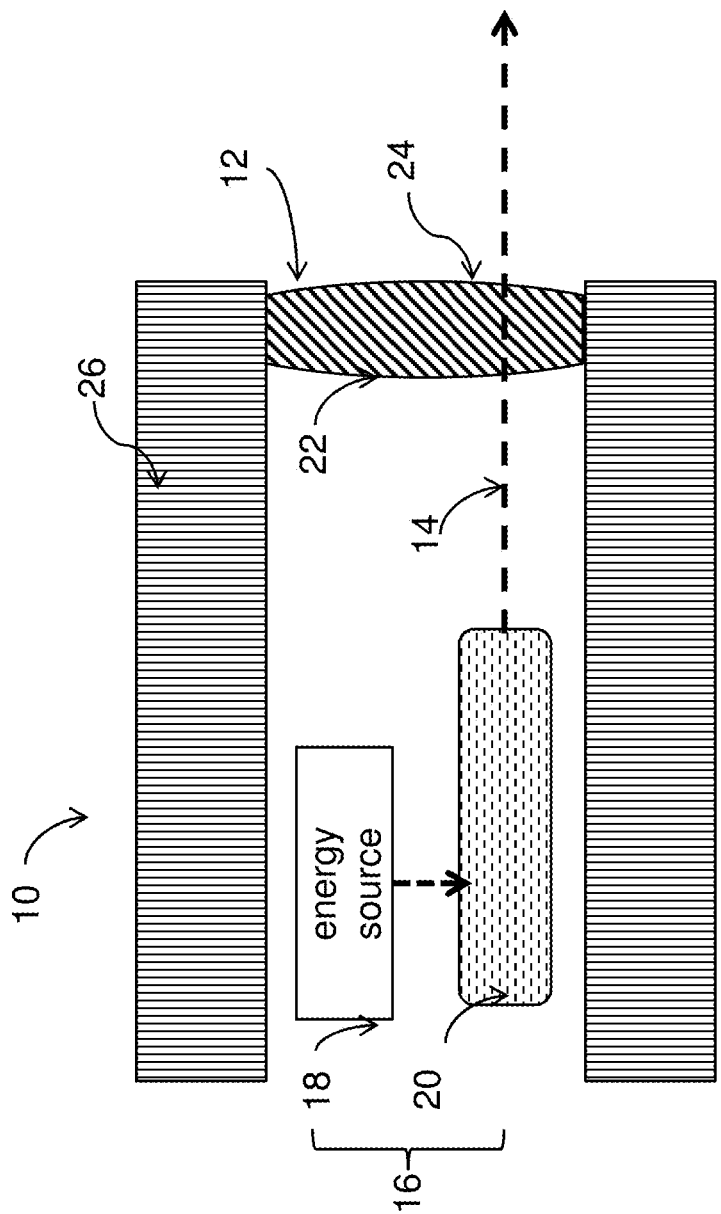
FIG. 1 is a side sectional view of an illustrative device which includes a spinel ceramic window.

FIG. 1 shows one embodiment of a device 10 including a ceramic shaped body 12 formed from a spinel powder. The shaped body transmits a laser beam 14 emitted by a laser source 16, which may include an energy source 18 and a gain medium 20, such as a rare earth sesquioxide ceramic gain medium. Examples of such gain media include Yb:$Y_2O_3$, Yb:$Lu_2O_3$, Er (Ho):$Lu_2O_3$, and $Sc_2O_3$. The illustrated shaped body has curved transmission faces 22, 24, although in other embodiments, the faces may be planar. The shaped body 12 may be mounted to a housing 26 for the laser source. An exit aperture window 12 for high-energy laser (HEL) applications formed as described herein possesses low absorption and scattering losses and is environmentally rugged and strong in order to protect the laser gain medium without compromising the light propagating through the window. It is to be appreciated, however, that the shaped body is not limited to use in laser transmission applications. For example, the ceramic material finds use in smart phone windows, IR apertures and domes, e.g., for missile guidance systems, personal protection, e.g., transparent body armor and goggles, and bulletproof/transparent windows for vehicles, such as automobiles, tanks, trains, aircraft, submarines, and space vehicles.

Figure 2:
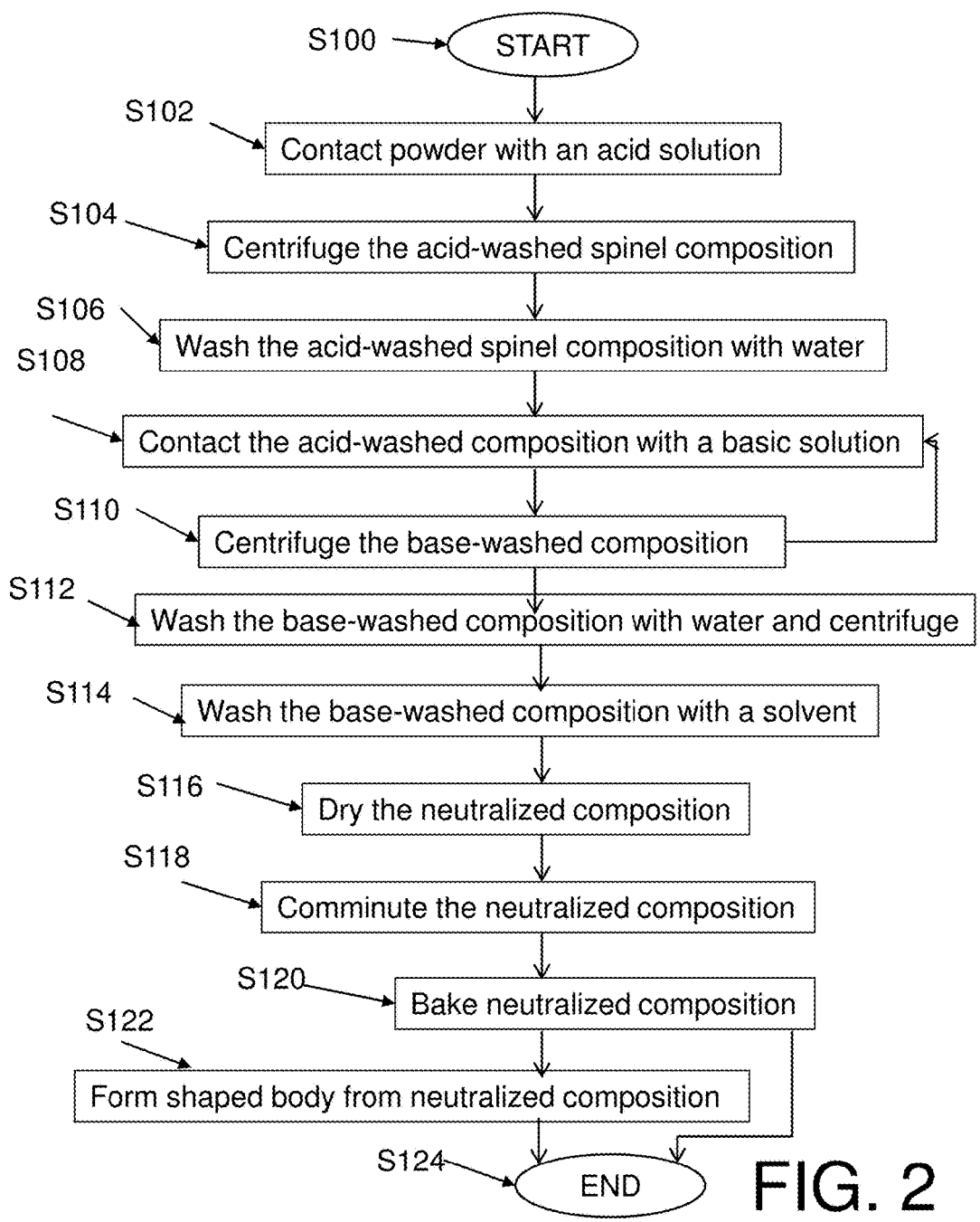
FIG. 2 is a flow chart illustrating a method of purifying a spinel-containing powder in accordance with one aspect of the exemplary embodiment.

With reference to FIG. 2, a flow chart illustrating an exemplary embodiment of the method, referred to herein as acid+base washing, is shown. The method begins at S100.

At S102, a spinel starting powder which is predominantly spinel is contacted, e.g., washed, with an acid solution to form an acid-washed spinel powder. The spinel powder used as the starting material may be at least 90 wt. %, or at least 95 wt. %, or at least 98 wt. % $MgAl_2O_4$, and in some embodiments, up to 99.8 wt. % $MgAl_2O_4$, or up to 99.5 wt. %, or up to 99 wt. % $MgAl_2O_4$. In particular embodiments, the median particle size of the unpurified spinel powder used as the starting material may be between 0.1 and 3 μm, or up to 1 μm, as measured by laser diffraction/scattering using a Horiba LA-950 system.

For the acid washing step, the spinel starting powder may be mixed with an acid, in a ratio of 2:1 to 1:20, by weight. The acid used may be nitric acid, sulfuric acid, hydrochloric acid, acetic acid, or the like. The acid may be in an aqueous solution. The acid solution may have a pH of less than 6, e.g., up to 5, or up to 4, or up to 2. The acid solution may include at least 0.001M, or at least 0.01M acid. For example 100 g of powder is mixed with about 50-200 ml of a 1 mM to 20M acid solution, which may be formed by dilution of a concentrated acid with water to form a 1 wt. % to 90 wt. % acid solution. The powder may be contacted with the acid at a temperature of from about room temperature (15-25° C.) up to the to the boiling point of the acid solution, which is over 83° C., in the case of diluted nitric acid. About 95° C. is a suitable temperature. The contacting time may be from 5-60 or 30-50 minutes at this temperature. The acid washed spinel powder is acidic, e.g., has a pH of less than 7, such as less than 6.5.

At S104, residual acid solution is removed. For example, the acid-washed spinel powder is centrifuged to remove residual acid solution and impurities that are dissolved in the acid solution. For example, centrifugation may be carried out in a polypropylene or Teflon jar may be performed and the liquid containing impurities decanted off.

At S106, after centrifuging the acid-washing spinel powder, the powder may be washed with water to remove additional traces of the acid. In particular embodiments, the water is de-ionized water. The acid-washed powder may be washed with water three or four times, or more. Even after many washings, the residual powder is still slightly acid, such as a pH of less than 7, such as less than 6.9, or less than 6.8.

At S108, the acid-washed powder is contacted, e.g., washed, with a basic solution to form a base-washed spinel powder. Example basic solutions include aqueous solutions of ammonium hydroxide, ammonium carbonate and bicarbonate. The base in the solution is non-metallic base to avoid recontamination of the powder with metal ions. The exemplary base solution is metal-free, by which it is meant that the base solution contains, in total, less than 10 ppm by weight of metals (in any form), or less than 1 ppm by weight of such metal. The basic solution can be very weak, e.g., having a pH only slightly above that of water (pH 7). For example, the basic solution may have a pH of 7.1 to 14 or up to 9, or up to 8.5, or up to 8, or at least 7.2, or at least 7.5. The basic solution may include at least 0.001M, or at least 0.01M base. For example the residual powder (about 100 g) is mixed with about 50-200 ml of a 0.1 mM to 1M basic solution. An example basic solution, may be an aqueous solution containing 0.1 to 10 wt. %, or 0.5 to 5 wt. %, e.g., about 1 wt. % of ammonium hydroxide. Contacting may be performed for about 5-10 minutes.

At S110, residual basic solution is removed. For example, the base-washed spinel composition is centrifuged to remove residual basic solution and impurities contained therein.

In particular embodiments, steps S108 and S110 are repeated one or more times until the pH of the base-washed spinel composition is within a selected range. For example, the base washing step may be repeated, if needed, one or more times until the pH range of the powder (as measured by the pH of the washing liquid containing the powder) is above 7.0, e.g., in the range of, for example 7.01-8.5, or up to 7.5. The pH can be measured for each washing dispersion containing spinel and basic washing solution using a pH meter. In the examples below, a pH meter, Model pH2700 from Oakton Instruments, Vernon Hills, Ill., was used.

At S112, the base-washed powder may be washed with deionized water one or more times, with the washing liquid removed by centrifuging in between each wash.

At S114, the base-washed composition is washed with a non-aqueous solvent to remove residual water. In particular embodiments, the solvent is a non-hydrogen bond forming solvent. The non-hydrogen bonding (aprotic) solvent may be a polar aprotic solvent, e.g., acetone, N,N-dimethyl formamide (DMF), acetonitrile, dimethyl sulfoxide, dichloromethane, tetrahydrofuran, ethyl acetate, or mixture thereof. The solvent washing avoids clumping of the particles which may occur due to OH bond formation. The solvent washing may be performed at from 15° C. up to the boiling point of the solvent (e.g., 80-110° C.), for from 30 minutes to several hours, e.g., overnight. Residual water may be removed in this step. The solvent washing may be performed two or more times.

At S116, the neutralized, solvent-washed spinel composition is dried at a suitable drying temperature to remove residual solvent and water, e.g., in an oven set at from 80-110° C., such as over 100° C. (e.g., above the boiling points of the solvent and water), for several hours, e.g., overnight.

This results in a slightly basic spinel powder. In some embodiments, the pH range of the base-washed spinel powder is at least 7.0. In further embodiments, the pH range of the base-washed spinel powder is at most 8.5. In exemplary embodiments, the pH of the base-washed composition is from 7.0 to 8.5, or greater than 7.0, such as at least 7.1, or at least 7.5, or up to 8, or up to 7.5.

The solvent washed powder is then comminuted, e.g., in a ball-milled in a ball mill or ground with a pestle and mortar (S118), to form a fine powder.

At S120, the neutralized spinel powder may be calcined at a suitable temperature, e.g., at about 600° C. for several hours, such as 4-8 hours, e.g., 6 hours, to remove organic impurities.

At S122, the resulting purified spinel powder may be formed into a shaped ceramic body.

The method ends at S124.

The purified spinel powder may contain, for example, impurities such as Na, Li, K, Ba, Ca, Cr, Fe, Mn, Ti, Zr, Sr, Si, P, and S, at up 16 ppm by weight each, or up to 30% of the ppm by weight of the element in the starting material, and in many cases lower. For example, Ca, Si, and Zr may each be less than 10 ppm by weight, and Na, P, S, K, Ti, Mn, Cu, Zn, and Ba may each be less than 5 ppm, or less than 1 ppm, even with very impure starting materials.

Figure 3:
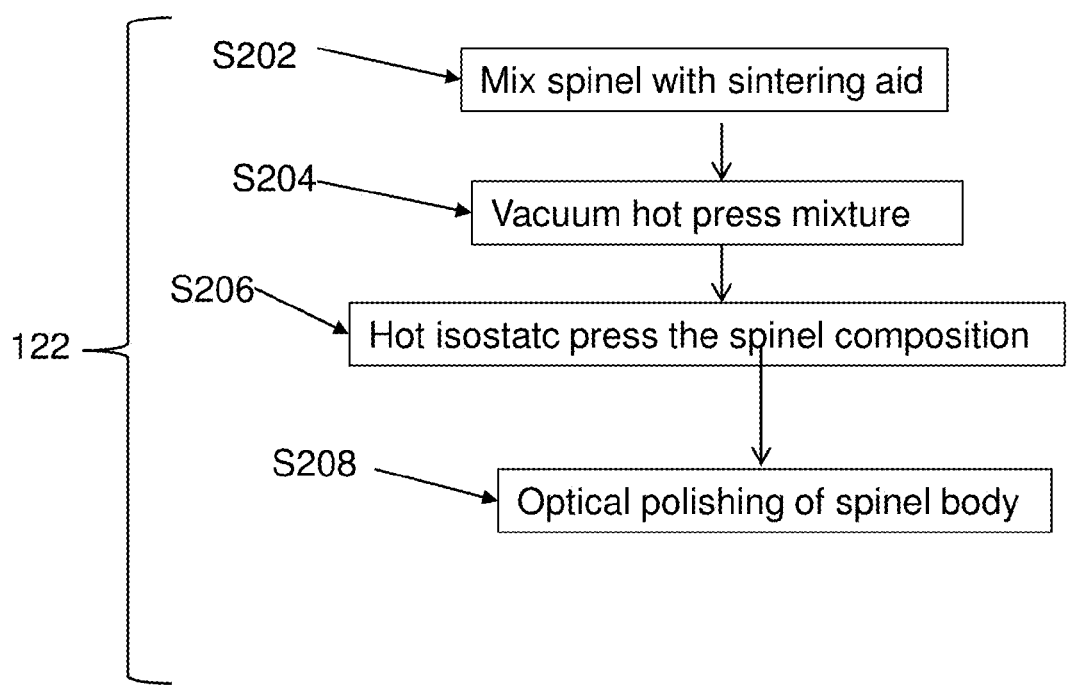
FIG. 3 illustrates a method for forming a ceramic body from the purified spinel-containing powder in accordance with another aspect of the exemplary embodiment.

As illustrated in FIG. 3, the formation of the ceramic body (S122) may include forming a mixture of the powder with a sintering aid, such as LiF (S202). The sintering aid can be incorporated into the powder by manual mixing or by a precipitation coating technique according to the methods described in U.S. Pat. Nos. 7,611,661 and 7,528,086, which can result in a more homogeneous mixture of the sintering aid and particles. The amount of sintering aid used may depend on the surface area of the powder, with higher amounts used at higher surface area. The sintering aid can help to increase the optical quality of the finished ceramic body. However, the present acid+base purification method reduces the amount of sintering aid needed to provide the same absorption. For example, the sintering aid, if used, may be present at 0.1 wt. % to 5 wt. %, such as at least 0.5 wt. %, or at least 1 wt. %, or at least 1.5 wt. %, or about 2 wt. %. In some embodiments no sintering aid is used, or is used at less than 0.1 wt. %.

At S204, hot pressing may then be used to densify the powder at a temperature sufficient to remove the sintering aid (if used), e.g., above the melting point of LiF (which is about 850° C.). For example hot pressing may be performed at a temperature of from 1200° C. to 1800° C. and a pressure of 30-60 MPa for 2-6 hours.

The densified body may then be subjected to hot isostatic pressing, e.g., at a temperature of 1400-1800° C. or at least 1500° C., or up to 1700° C., in an inert gas such as argon at a pressure of, for example at least 150 MPa for several hours (S206). The resulting ceramic body may be optically polished (S208).

Further details on formation of ceramic bodies are provided in W. Kim, et al., "Yb$^{3+}$ doped Lu$_2$O$_3$ powder for high power solid state lasers," J. Am. Cer. Soc., 94, 3001-3005 (2011); and J. Sanghera, et al., "10% Yb$^{3+}$—Lu$_2$O$_3$ ceramic laser with 74% efficiency" Opt. Lett. 36, 576-578 (2011).

Spinel powder suitable for use as the starting material may be synthesized by chemical co-precipitation methods using aluminum and magnesium salts, such as sulfates, nitrates, and chlorides. The individual metal oxides may first be separately dissolved in acid and the solution filtered to remove insoluble impurities and particles. These precursors are co-precipitated to form an intermediate composition of the corresponding metal hydroxides. Calcination of the intermediate composition in air or oxygen environment is used to convert the hydroxides into the magnesium aluminum oxide spinel. It is to be noted that although the starting and ending spinel powder may be described herein as being MgAl$_2$O$_4$, the spinel is actually non-stoichiometric in Mg and/or Al, due to the presence of impurities, and could be represented as Mg$_{(1-x)}$Al$_{(2-y)}$X$_n$O$_4$, where x and y are each >0 and <<0.001, X represents the impurity metals present, and n is the moles of the impurity metals that render the formula stoichiometric. Additionally, the ratio of Mg to Al may be non-stoichiometric. The exemplary method is not limited to starting materials produced by such methods. In one embodiment, the starting material is relatively impure spinel, e.g., which contains, in total, at least 10 ppm or at least 50 ppm, by weight, of impurities, and up to 100,000 ppm by weight of impurities, or up to 20,000 ppm by weight of impurities, in the form of elements other than Mg, Al, and O, such as elements from Groups IA, IIA, IIIB, IVB, VB, VIB, VIIB, VIII, IB, IIB, IIIA, IVA, VA, VIA. Examples of such impurities which may each be present at 1 ppm by weight or higher include those from the group consisting of Group IA: Li, Na, K, Group IIA: Ca, Sr, Ba; Transition elements: Ti, Cr, Fe, Mn, Co, Ni, Cu, Zn, Group IIIA: Ga; Group IVA: Si, C; Group VA: P, and Group VIA: S.

The chemical and also physical impurities generally found in commercial starting materials tend to make them unsuited to providing high optical quality ceramics suitable for HEL applications. The present method allows starting materials with impurities to be used in preparing such ceramics.

The purified spinel may be at least 99.9 wt. %, or at least 99.99 wt. % stoichiometric MgAl$_2$O$_4$.

The exemplary method which includes both acid and base washing is able to reduce absorption loss in spinel ceramic fabricated using spinel powder from >20,000 ppm/cm (or >100,000 ppm/cm) to 75 ppm/cm, or less, such as 35 ppm or less, as compared to a ceramic formed form the starting material. In particular, the acid and base solutions selectively remove different types of impurities. The combination of acid and basic solutions tends to remove single metal oxides, such as Al$_2$O$_3$, MgO, Y$_2$O$_3$, Sc$_2$O$_3$, Fe$_2$O$_3$, and Lu$_2$O$_3$, and Na, S, Mg, Ca, Fe, Cu, and Cr to a greater extent than washing solely with an acid or base solution alone.

Acid washing alone results in a harder, agglomerated powder, which does not sinter as well, resulting in poorer optical quality after sintering than when acid+base is used.

The purified spinel powder may have a surface area of 20-50 m$^2$/g, such as about 30 m$^2$/g, as measured by the BET method.

The purified spinel produced in the exemplary method is suited to use in laser applications due to its high mechanical strength, high thermal conductivity, and excellent optical transmission between 0.2-5 μm.

A transparent magnesium aluminate spinel (MgAl$_2$O$_4$) ceramic produced from the purified powder provides a rugged window and dome material operating from the UV to the mid-IR. FIG. 3 shows the transmission spectra of three ceramic materials: spinel, ALON and sapphire, and demonstrates the superior infrared transmission of spinel.

Table 1 shows physical properties of various window materials.

TABLE 1

Physical properties of example window materials

| Parameters | Spinel | ALON | Sapphire |
|---|---|---|---|
| Crystal Structure | Cubic | Cubic | Hexagonal |
| Density (g/m$^2$) | 3.58 | 3.77 | 3.98 |

TABLE 1-continued

Physical properties of example window materials

| Parameters | Spinel | ALON | Sapphire |
|---|---|---|---|
| Hardness (kg/mm$^2$) | 1645 | 1850 | 2200 |
| Fracture Toughness (MPa · m$^{1/2}$) | 1.9 | 2 | 2 |

Without intending to limit the scope of the exemplary embodiment, the following examples illustrate preparative methods and results.

EXAMPLES

A commercially available spinel powder (Baikowski, 100 g) was used for this study. The powder was washed in acid (250 ml concentrated nitric acid, (70%), at a temperature of 95° C., for 30 minutes). The acid-washed powder was rinsed in DI-H$_2$O and centrifuged. The acid washing and centrifuging was repeated 5 times. The washed powder was neutralized by washing with 0.1N ammonium hydroxide solution for 5 minutes. For the basic solution, ammonium hydroxide solution containing 28% NH$_3$ (Aldrich Chemicals) is used as is or further diluted with water. The base washing and centrifuging was repeated 2 times until the pH reached 7.8. The base-washed powder was rinsed in deionized water and centrifuged. This was repeated several times. The acid+base washed powder was solvent washed in acetone at room temperature, for one hour, 3 times, and dried at 100° C. overnight.

Ceramic samples were prepared in the form of disks of about 2.5 cm diameter and of different thicknesses, in the range of about 3-8 mm in thickness (distance). For the ceramic fabrication, the powder was manually mixed with 0.5 wt. % sintering aid (lithium fluoride), if needed. The powder was placed in graphite die lined a graphite-foil (Grafoil® Grade GTA, from Graftec, Cleveland, Ohio) and hot pressed to densify the powder. The hot pressing included a hold at lower temperature (950° C.) to remove the LiF sintering aid and a final hold at higher temperature to densify the samples (1500° C. for 2 hours at a pressure of 50 MPa). Samples were 99% of theoretical density. At this point the samples were transparent, but there was visible scattering due to residual porosity that would not have allowed lasing. Samples were then hot isostatically pressed at 1500° C.-1700° C. in argon at 200 MPa for 5 hours and optically polished for optical characterization.

The median particle size and distribution of the purified powder were measured by laser diffraction/scattering using a Horiba LA-950 system. The median particle size is 0.1-3 micron.

The chemical analysis of the powder and ceramic were characterized using glow discharge mass spectroscopy (GDMS) (EAG Lab, Liverpool N.Y.).

Absorption loss measurements were performed on polished ceramic samples using the Photothermal Commonpath Interferometry (PCI) method. The PCI method uses a two-laser system, which includes a pump laser and a probe laser. The pump laser is at the wavelength of interest (1.06 µm was used in this study) and is focused in the sample. The probe laser is a HeNe laser that interrogates the area affected by the pump laser. Distortions caused by the pump laser in the material cause interference in the probe laser that is directly proportional to the material absorption See, Alexandrovski, et al., "Photothermal common-path interferometry (PCI): new developments," Proc. SPIE 7193, 71930-42 (2009).

Transmission measurements on polished ceramics were performed using UV-vis and FTIR spectrometers.

Results

Figure 4:
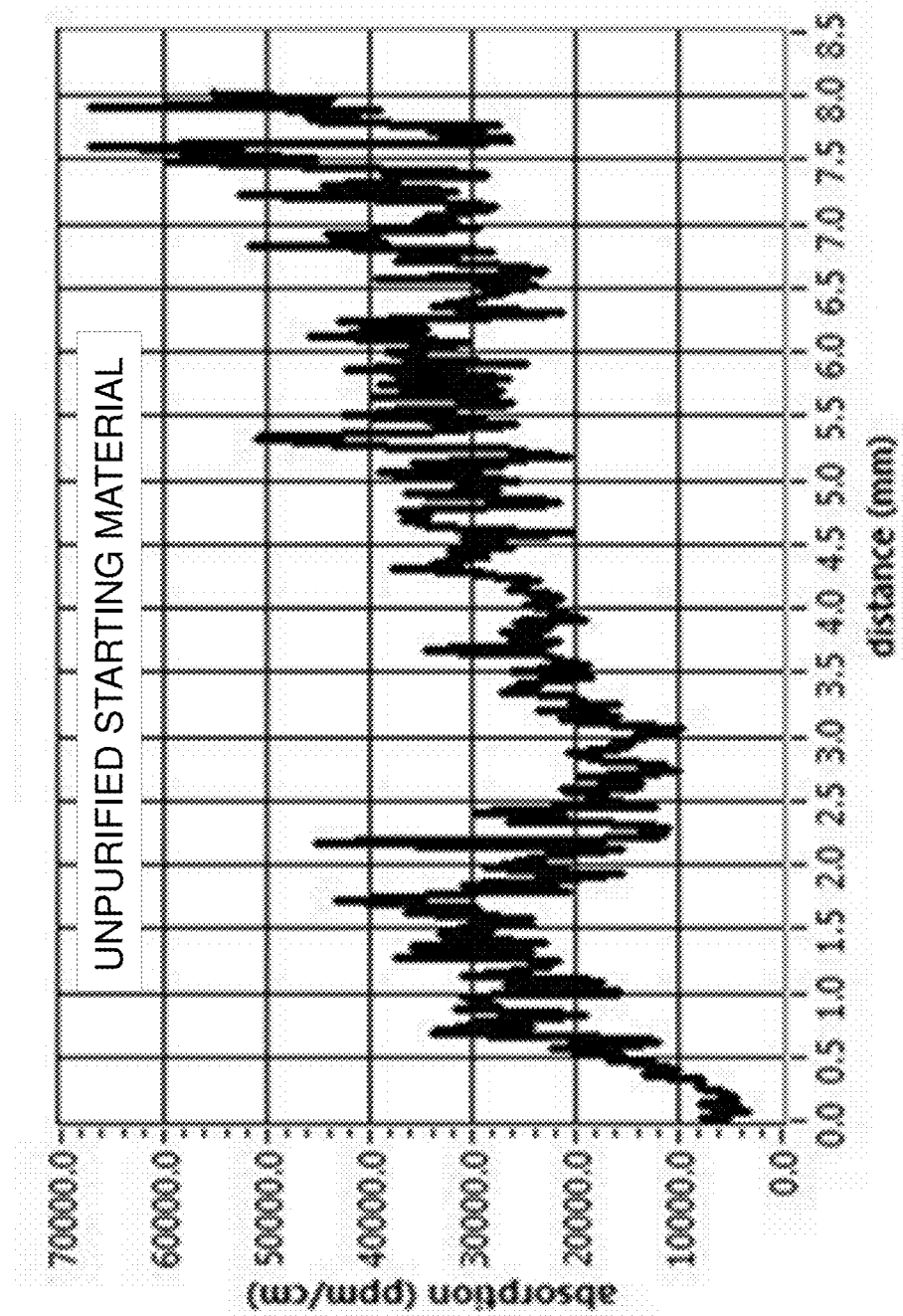
FIG. 4 is a graph of absorption at 1.06 µm of a spinel ceramic fabricated using a low purity spinel powder.

Initial ceramic samples made using the commercial Baikowski spinel powder (without purification by the exemplary method) had very high absorption losses due to intrinsic impurities. FIG. 4 shows the typical absorption plot of the ceramic formed from the starting material, without further purification. A high absorption, >20,000 ppm/cm, is measured for an 8 mm thick spinel sample at 1.06 µm. The ceramics fabricated using commercial (unpurified) powder resulted in a grey or transparent ceramic, but with some dark and white spots. The darkening is mainly due to the presence of chemical impurities that absorb light and the splotches due to hard agglomerates or secondary phase impurities in the powder which make it very difficult to densify into a uniform and transparent ceramic.

Figure 5:
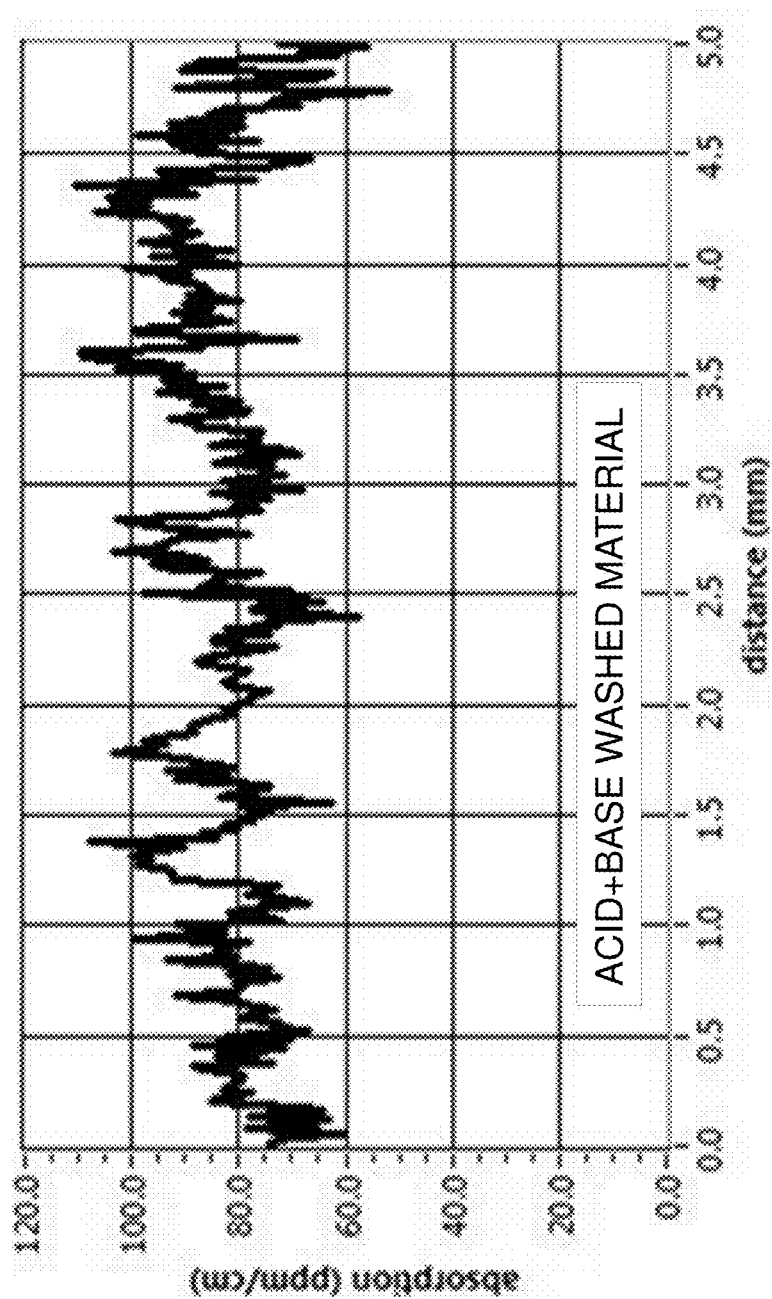
FIG. 5 is a graph of absorption at 1.06 µm of a spinel ceramic fabricated using the low purity spinel powder used for forming the ceramic of FIG. 4, after being purified by the exemplary method.

FIG. 5 shows the corresponding results for the acid+base washed powder. It can be seen that, even with a relatively impure starting material, the absorption in ppm/cm dropped significantly. A dramatic decrease in absorption from tens of thousands ppm/cm to less than 100 ppm/cm has been measured from ceramics fabricated using as-received commercial powder and acid washed powder, respectively.

Table 2 shows chemical analysis results.

TABLE 2

Chemical analysis results of the commercial spinel powder and acid + base washed powder

| Element | Commercial powder Concentration (ppm wt.) | Acid + Base washed powder Concentration (ppm wt.) |
|---|---|---|
| Na | 43 | 0.88 |
| S | 660 | 380 |
| K | 34 | 0.77 |
| Ca | 7.7 | 0.66 |
| Cr | <1 | <1 |
| Fe | 2.3 | <1 |
| Co | <0.1 | <0.1 |
| Ni | <0.5 | <0.5 |
| Cu | <10 | <10 |
| Zn | <1 | <1 |

It can be seen that that some elements, such as Na, S, Si, and K, are present in tens to hundreds of ppm in the commercial (unpurified powder). Transition metals, such as Fe were also detected, but at lower levels. Such impurities represent absorption or scattering sites in the ceramic. Some elements such as F, P, S, Cl, Br, I, and C are not an issue because they are volatilized and removed from the ceramic during the hot press process. On the other hand, many single elemental oxides, such as Al$_2$O$_3$, MgO, Y$_2$O$_3$, Sc$_2$O$_3$, Fe$_2$O$_3$, and Lu$_2$O$_3$, are soluble in certain acids, while the spinel itself is not. Therefore, such single element oxides can be removed by dissolving in acid. The solubility difference between spinel and other impurities is thus utilized to purify the commercial spinel powder. Table 2 shows that simply acid washing effectively removes various impurities such as Na, S, K, and Ca. More importantly, transition metals such as iron are reduced to below the detection limit of GDMS. Ceramics fabricated using such powders are observed to be clearer and of higher optical quality ceramic. It is considered that this is mainly due to high purity of the acid washed powder.

In other experiments, spinel powders (denoted samples 1 and 2) with high levels of impurities were used to prepare ceramic bodies. Impurities in the spinel powder before and after the acid+base treatment are shown in Table 3. Elements below 1 ppm in the starting material are not shown.

TABLE 3

Chemical analysis data of spinel before and after purification, measured by GDMS

| | Sample 1 | | Sample 2 | |
|---|---|---|---|---|
| Element | Before purification (ppm wt.) | After purification (ppm wt.) | Before purification (ppm wt.) | After purification (ppm wt.) |
| Li | 17000 | 5.1 | 14000 | 14 |
| F | ~100 | ~3 | ~300 | <0.5 |
| Na | 130 | 14 | 53 | 2.8 |
| Si | 48 | 6.9 | 53 | 4.6 |
| P | 1.9 | 0.66 | 2.5 | 0.82 |
| S | 6.8 | 1.8 | 10 | 1.2 |
| Cl | 2.6 | 1.5 | 1.1 | <0.5 |
| K | 4.1 | 0.41 | 2 | 0.66 |
| Ca | 40 | 8.2 | 51 | 8.2 |
| Ti | 2.4 | 1.9 | 2.2 | 0.99 |
| Cr | 41 | 9.6 | 47 | 12 |
| Mn | 2.5 | 0.55 | 2.8 | 0.55 |
| Fe | 66 | 12 | 88 | 15 |
| Ni | 7.7 | 1.2 | 10 | 1.9 |
| Cu | 1.4 | 1.1 | 1.9 | <0.5 |
| Zn | 3.5 | <0.5 | 4.3 | 0.94 |
| Ga | 3.6 | 3.4 | 3.3 | 3.6 |
| Sr | 0.88 | 0.24 | 1 | 0.26 |
| Zr | 9.4 | 5 | 13 | 5.5 |
| Ba | 2.2 | <0.1 | 5.3 | 0.24 |
| C | 1900 | 390 | 1100 | 255 |

Figure 6:
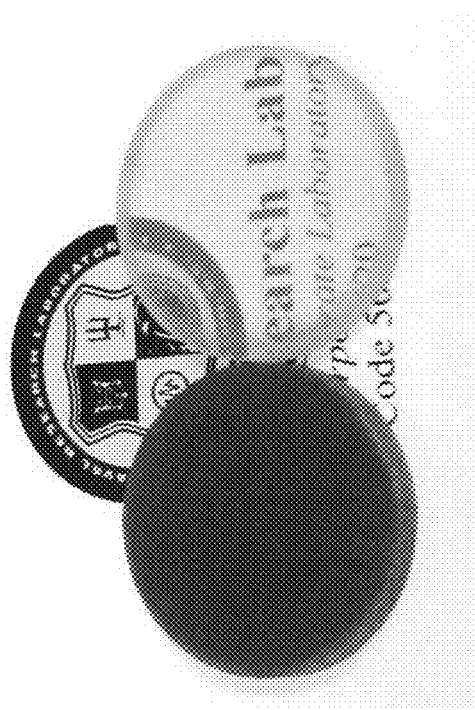
FIG. 6 is a photograph showing ceramic bodies made with and without acid+base washing.

It was observed that ceramic hot pressed with as-received powder turned black, while ceramic hot pressed with acid+base washed powder turned clear, as shown in FIG. 6.

TABLE 4 is an estimate of the contribution of several impurity transition metals to the absorption loss.

TABLE 4

| Loss in ppm cm$^{-1}$ per ppm of TM ion impurity, at 1.06 mm | |
|---|---|
| TM/RE ion | loss in ppm cm$^{-1}$ |
| Fe | 230 |
| Ni | 207 |
| Cu | 1150 |
| Cr | 1030 |

The results demonstrate the ability to fabricate high optical quality transparent spinel ceramics for High Energy Laser applications using commercial powder. A convenient and economical powder purification method to significantly lower the absorption loss of transparent spinel ceramics using commercial powders is described. Acid+base washing has been successfully used to reduce absorption loss in spinel ceramic fabricated using commercial powder from >20,000 ppm/cm down to 75 ppm/cm.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade.

It is to be understood that the upper and lower amount, range, and ratio limits set forth herein may be independently combined. Similarly, the ranges and amounts for each element of the invention may be used together with ranges or amounts for any of the other elements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of purifying a spinel powder, the method comprising:
    a) contacting a spinel powder with an acid solution to form an acid-washed spinel composition;
    b) contacting the acid-washed spinel composition with a basic solution, wherein the basic solution is metal-free; and
    c) removing alumina to form a purified composition.

2. The method of claim 1, wherein the contacting of the powder with an acid solution to form an acid-washed composition further comprises removing residual acid by at least one of:
    i) centrifuging the acid-washed spinel composition; and
    ii) washing the acid-washed spinel composition with water.

3. The method of claim 1, wherein the acid solution has a pH of less than 6.

4. The method of claim 1, wherein the contacting with the acid solution comprises contacting at a temperature in a range of from 15° C. to a boiling point of the acid solution.

5. The method of claim 1, wherein the acid solution comprises at least one of nitric acid, hydrochloric acid, and acetic acid.

6. The method of claim 1, wherein the acid solution comprises at least 0.001M acid.

7. The method of claim 1, wherein the contacting with the basic solution comprises:
    i) contacting the acid-washed composition with the base solution to form a base-washed spinel composition;
    ii) centrifuging the base-washed spinel composition; and
    iii) repeating steps i) and ii) until the base-washed spinel composition has a pH within a selected range.

8. The method of claim 7, wherein the selected pH range is from 7.0 to 8.5.

9. The method of claim 1, wherein the basic solution has a pH of at least 7.2.

10. The method of claim 1, wherein the basic solution comprises at least 0.001M base.

11. The method of claim 1, wherein the basic solution comprises a basic compound which is metal-free.

12. The method of claim 1, wherein the basic solution comprises at least one of ammonium carbonate and ammonium bicarbonate.

13. The method of claim 1, further comprising, after b), washing the base-washed spinel composition with a solvent.

14. The method of claim 13, wherein the solvent is an aprotic solvent.

15. The method of claim 1, further comprising, after c), at least one of:
    d) drying the purified composition at a drying temperature of at least 100° C.;
    e) comminuting the purified composition; and f) baking the purified composition at a baking temperature of at least 600° C.

16. The method of claim 1, wherein the spinel powder comprises at least 90 wt % $MgAl_2O_4$.

17. The method of claim 1, wherein the method further comprises:
forming a shaped body from the purified composition.

18. The method of claim 17, wherein the forming comprises at least one of hot pressing, hot isostatic pressing, sintering, and polishing.

19. The method of claim 17, wherein the shaped body is at least one of a window, a lens, a transparent armor component, a vehicle component, an aircraft component, a satellite component, a missile component, and an armored canopy component.

20. The method of claim 17, wherein the shaped product has an absorption of less than 200 ppm/cm at 1.06 μm as measured by Photothermal Common-path Interferometry.

21. The method of claim 1, additionally comprising removing rare-earth oxides including $Lu_2O_3$, $Y_2O_3$, $Sc_2O_3$, or any combination thereof from the acid-washed spinel composition that was contacted with the basic solution.

22. A method of forming a shaped body comprising:
a) contacting a powder comprising a spinel with an acid solution to form an acid-washed spinel composition;
b) contacting the acid-washed spinel composition with a basic solution, wherein the basic solution is metal-free;
c) removing alumina to form a purified composition having a pH of from 7-8.5; and
d) sintering the purified composition to form the shaped body.

* * * * *